United States Patent Office 3,441,615
Patented Apr. 29, 1969

3,441,615
ALKOXY AROMATIC ETHERS
Edward P. Merica, Midland, Mich., assignor to The Dow Chemical Company, Midland, Mich., a corporation of Delaware
No Drawing. Filed Nov. 5, 1962, Ser. No. 235,549
Int. Cl. C07c *43/20, 41/10*
U.S. Cl. 260—613   7 Claims The present invention relates to a novel class of alkoxy aromatic ethers. More particularly the present invention concerns the novel class of ethers characterized by the following general formula:

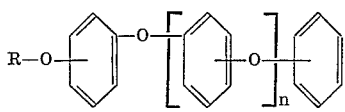

wherein R represents an alkyl radical having from about 8 to about 20 carbon atoms and $n$ represents an integer from 0 to about 4.

The new compounds have been tested and found to be useful as high temperature lubricants characterized by their thermal stability at temperature up to 750° F. and excellent resistance to oxidative degradation at temperatures up to at least 500° F. and in many instances by having extremely low pour points, i.e. below zero to −80° F. Further the new compounds have exhibited good thermal conductivity which, coupled with their heat stability, high boiling point and low freezing point, makes them useful as heat transfer fluids. Still another use to which the new compounds can be put is as transformer fluids since the compounds exhibit in addition to their heat stability, good thermal conductivity, high boiling point, low freezing point, good dielectric properties. These and other uses will become apparent to those skilled in the art from the following description and claims.

The novel compounds which exhibit the properties above set forth are those alkoxy aromatic ethers having from about 8 to 20 carbon atoms in the alkoxy moiety and from 2 to 6 aryl ether moieties. Thus, for example, one can prepare and employ: alkoxyphenoxy benzene, alkoxyphenyl phenoxyphenyl ether, alkoxyphenoxy phenoxyphenoxy benzene, alkoxyphenoxyphenyl phenoxyphenoxyphenyl ether, alkoxyphenoxyphenoxy phenoxyphenoxyphenoxy benzene, and the like. The various isomers thereof can be prepared and employed, as for example, 3-alkoxyphenyl 3-phenoxyphenyl ether, 4-alkoxyphenyl 4-phenoxyphenyl ether and the like, as well as mixtures thereof. Since each of the new compounds has good high temperature stability but not all have freezing points below °0 F., it is advantageous to employ the mixed isomers of the new compounds and even often advantageous to employ mixtures of two or more compounds having different numbers of ether linkages to prepare low-freezing oils. To further illustrate the scope of the novel compounds, particularly with respect to the alkoxy moiety, the following list of alkoxy ethers is given, it being understood that similar substitution can be made in the alkoxy moiety of the above enumerated generic and subgeneric descriptions of the various polyethers:

1-(n-octoxy)-3-phenoxybenzene,
1-(n-nonoxy)-3-phenoxybenzene,
1-(n-decoxy)-3-phenoxybenzene;
1-(n-undecoxy)-3-phenoxybenzene,
1-(n-dodecoxy)-3-phenoxybenzene,
1-(n-tridecoxy)-3-phenoxybenzene,
1-(n-tetradecoxy)-3-phenoxybenzene,
1-(n-pentadecoxy)-3-phenoxybenzene,
1-(n-hexadecoxy)-3-phenoxybenzene,
1-(n-heptadecoxy)-3-phenoxybenzene,
1-(n-octadecoxy)-3-phenoxybenzene,
1-(n-nonadecoxy)-3-phenoxybenzene,
1-(n-eicosoxy)-3-phenoxybenzene,
m(n-octoxy)phenyl m-phenoxyphenyl ether,
m-(n-decoxy)-phenyl m-phenoxyphenyl ether and the like.

The following general procedures are expedient methods for preparing the novel compounds:

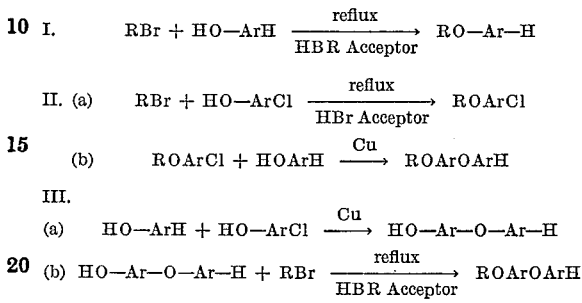

Ar represents a phenylene, phenyloxy phenylene, phenoxyphenoxyphenylene, and R represents an alkyl radical having from about 8 to 20 carbon atoms.

In reaction I an alkyl bromide is reacted with phenoxyphenol, phenoxyphenoxyphenol, phenoxyphenoxyphenoxy phenol or the like in the presence of an HBr acceptor and at about the reflux temperature for about 1 to about 24 hours to produce the corresponding alkoxyphenoxybenzene, alkoxyphenyl phenoxyphenyl ether, alkoxyphenoxy phenoxyphenoxybenzene and the like.

In reaction II(a) a chlorinated phenoxyphenol is reacted with an alkyl bromide in a manner and under conditions similar to I to produce the corresponding alkoxyphenoxychlorobenzene, for example, which is further reacted with phenol or a phenoxyphenol in the presence of a copper catalyst and alkali metal hydroxide to produce the corresponding alkoxyphenylphenoxyphenyl ether or alkoxyphenoxy phenoxyphenoxy benzene, respectively.

In reaction III(a) a phenoxyphenol, phenoxyphenoxyphenol or the like is reacted with a chlorophenoxyphenol or higher ether in the presence of copper catalyst and an alkali metal hydroxide and the product, a hydroxyphenoxyphenoxybenzene, hydroxyphenoxyphenyl phenoxyphenyl ether or the like is further reacted with an alkyl bromide under conditions similar to reaction I to produce the corresponding alkoxy polyether.

It is to be understood that the solvent here employed is an organic polar solvent such as acetone or dimethylformamide, N-methylformamide and the like.

It is to be understood that other methods can be employed for preparing the novel compounds but the above methods appear to be economically expedient at this time.

The following examples are illustrative of the present invention but are not to be construed as limiting.

Example 1.—m-(n-Octyloxy)phenoxybenzene

A mixture of 193 grams (1 mole) of n-octyl bromide, 279 grams (1.5 moles) of phenoxyphenol (85% by weight meta isomer and 15% by weight para isomer) and 170 grams (1.25 moles) of potassium carbonate in 600 ml. of acetone was refluxed for 10 hours. The solids which formed were removed by filtration, the acetone distilled on a steam bath and 400 ml. of 5% sodium hydroxide added to the residue with stirring. The aqueous layer which formed was separated and the organic layer distilled to recover 223 grams of a fraction boiling at 178–180° C. which was identified as 3-(n-octoxy)phenoxybenzene. This represents an 82% yield based on n-octyl bromide consumed.

Example 2

In the manner of Example 1, employing the indicated materials according to the reactions:

(I)  $RBr + HO—\phi—Cl \rightarrow RO—\phi—Cl$ (II) $R—O—\phi—Cl + K—O—\phi—O—\phi H \rightarrow$
$R—O—\phi—O—\phi—O—\phi H$ $\phi$ represents a bivalent benzene nucleus, i.e. phenylene
The following materials were prepared.

| | Reaction I | | | | | Reaction II | | | |
|---|---|---|---|---|---|---|---|---|---|
| Alkyl Bromide, mols | m-Chlorophenol, mols | $K_2CO_3$, mols | Acetone, ml. | Intermed. product | Intermed. product, mols | Hydroxy phenoxy benzene, mols | KOH, mols | Cu, gms. | Product |
| $C_{12}$, 0.5 | 0.58 | 0.55 | 200 | $C_{12}O\phi Cl$ | 0.3 | 0.5 | 0.4 | 5 | $C_{12}H_{25}O\ \phi O\ \phi O\ \phi H$ |
| $C_{12}$, 2.0 | 3.0 | 2.7 | 1,000 | $C_{12}O\phi Cl$ | 1.0 | 2.0 | 1.5 | 20 | $C_{12}H_{25}O\ \phi O\ \phi O\ \phi H$ |
| $C_8$, 2.0 | 3.0 | 2.7 | 1,000 | $C_8O\phi Cl$ | 1.0 | 2.0 | 1.5 | 20 | $C_8H_{17}O\ \phi O\ \phi O\ \phi H$ |
| $C_{10}$, 0.6 | 0.9 | 0.81 | 400 | $C_{10}O\phi Cl$ | 0.35 | 0.7 | 0.52 | 10 | $C_{10}H_{21}O\ \phi O\ \phi O\ \phi H$ |
| $C_{10}$, 2.0 | 3.0 | 2.7 | 1,000 | $C_{10}O\phi Cl$ | 1.363 | 2.726 | 1.95 | 20+20 CuO | $C_{10}H_{21}O\ \phi O\ \phi O\ \phi H$ |
| | | | | $C_{10}O\phi Cl$ | 0.466 | [1] 0.932 | 0.699 | 12 | $C_{10}H_{21}O\ \phi O\ \phi O\ \phi O\ \phi H$ |
| $C_8$, 1.0 | | 1.0 | 500 | | | 1.0 | | | $C_8H_{17}O\ \phi O\ \phi H$ |
| $C_8$, 1.0 | | 1.25 | 600 | | | [2] 1.5 | | | $C_8H_{17}O\ \phi O\ \phi H$ |
| $C_{16}$ | | 1.25 | 600 | | | [2] 1.5 | | | $C_{18}H_{33}O\ \phi O\ \phi H$ |
| $C_{12}$ | | 1.25 | 600 | | | [2] 1.5 | | | $C_{12}H_{25}O\ \phi O\ \phi H$ |

[1] Phenoxyphenoxyphenol.  [2] 90% Metaisomer.

In a series of tests employing a Shell 4-Ball Tester, comparisons were made between the product 3-n-decoxy phenyl phenoxyphenyl ether, bis(phenoxyphenyl) ether, the unalkylated polyether of comparable molecular weight already accepted as a good lubricant, and also the alkyl polyether α-methylheptadecylphenoxybenzene. The pressure at seizure is set forth below:

| | (Weight, kg.) at seizure |
|---|---|
| Decoxy phenyl phenoxyphenyl ether | 74 |
| Bis(phenoxyphenyl) ether | 75 |
| α-Methylheptadecylphenoxybenzene | 80 |

In another series of tests the oxidation stability of the compounds of this invention and closely related compounds was determined by flowing 5 liters of air per hour through a 50-gram sample held at 500° F. for 24 hours. The viscosity of the sample was taken at 100° F. and 210° F. before and after the tests. The results of the viscosity measurements are set forth in percent increase in viscosity:

| | Percent viscosity, measured at— | |
|---|---|---|
| | 100° F. | 210° F. |
| Decoxy phenyl phenoxyphenyl ether | 83 | 41 |
| Monododecyldiphenyl ether | 142 | 48.5 |
| Resorcinyl neoheptanoate (with inhibitors) | 254 | 109 |

In another series of tests the volatility of the various compounds of the present invention was measured at 500° F. and 400° F. by passing a stream of 2 liters of air per minute for 6.5 hours at the indicated temperature (ASTM D-972-56). The results are set forth below:

| | Evaporation Loss, at— | |
|---|---|---|
| | 400° F. | 500° F. |
| Bis(phenoxyphenyl)ether | 3.2 | 41.7 |
| Decoxy phenyl phenoxyphenyl ether | 1.6 | 26.3 |
| Resorcinyl neoheptanoate (with inhibitors) | | 99.7 |

I claim:

1. A compound having the formula $$R—O—\underset{}{\phantom{X}}\phi—O—[\phi—O—]_n\phi$$

wherein R represents an alkyl radical having from about 8 to about 20 carbon atoms and $n$ represents an integer from 0 to 4.

2. m-Octoxyphenyl phenoxyphenyl ether.
3. m-Decoxyphenyl phenoxyphenyl ether.
4. m-Octoxyphenoxybenzene.
5. p-Octoxyphenoxybenzene.
6. m-Hexoxyphenoxybenzene.
7. m-Dodecoxyphenoxybenzene.

References Cited

UNITED STATES PATENTS 1,099,761  6/1914  Osterman _____ 260—613 XR
3,083,234  4/1963  Sax _____ 260—613

OTHER REFERENCES

Mahoney et al.: "Engine Oil Development," August 1958, WADC Technical Report 57–177, Part II, ASTIA Document No. 155862, pages 4 and 37 relied on.

Mahoney et al. (I), Jour. of Chem. Eng. Data, vol. 5, No. 2 (1960), pages 172–180.

BERNARD HELFIN, *Primary Examiner.*

U.S. Cl. X.R.

252—52, 64